(12) United States Patent
Mower et al.

(10) Patent No.: US 6,944,211 B2
(45) Date of Patent: Sep. 13, 2005

(54) METHOD AND SYSTEM FOR DERIVING DYNAMIC DATA CLOCKS FROM PN CODES

(75) Inventors: Vaughn L. Mower, Bountiful, UT (US); Merle L. Keller, Salt Lake City, UT (US); Kent R. Bruening, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 593 days.

(21) Appl. No.: 10/085,610

(22) Filed: Feb. 26, 2002

(65) Prior Publication Data

US 2003/0161383 A1 Aug. 28, 2003

(51) Int. Cl.[7] .................................................. H04B 1/69
(52) U.S. Cl. ...................................................... 375/150
(58) Field of Search ................................. 375/130, 139, 375/142, 143, 150, 152, 343, 347; 370/515

(56) References Cited

U.S. PATENT DOCUMENTS

| 4,225,935 | A | * | 9/1980 | Zscheile et al. | ............. 708/253 |
| 4,776,012 | A | * | 10/1988 | Zscheile et al. | ............. 380/46 |
| 4,942,590 | A | * | 7/1990 | Terada | ........................ 375/149 |
| 5,077,753 | A | * | 12/1991 | Grau et al. | ................. 375/141 |
| 5,923,287 | A | * | 7/1999 | Lennen | ................... 342/357.06 |
| 2003/0142725 | A1 | * | 7/2003 | Keller et al. | ................. 375/140 |

* cited by examiner

*Primary Examiner*—Young T. Tse
(74) *Attorney, Agent, or Firm*—Harrington & Smith, LLP

(57) ABSTRACT

A method and system for generating a data clock having edge coincidence with an aggregate PN code is provided. The method includes providing an aggregate PN code generator having an epoch output for resetting a data clock generator when the aggregate PN code generator generates an epoch signal. Between resets the data clock generator divides a PN master clock signal with a divisor derived from the prime factor(s) of one or two of PN codes used to form the aggregate PN code.

22 Claims, 9 Drawing Sheets

DSSS TRANSMITTER

DSSS RECEIVER

DMSOR Nc FORMULATION TABLE

| n | $2^n$ | $2^n*3$ | $2^n*3^2$ | $2^n*5$ | $2^n*7$ | $2^n*13$ |
|---|---|---|---|---|---|---|
| 0 | 1 | 3 | 9 | 5 | 7 | 13 |
| 1 | 2 | 6 | 18 | 10 | 14 | 26 |
| 2 | 4 | 12 | 36 | 20 | 28 | 52 |
| 3 | 8 | 24 | 72 | 40 | 56 | 104 |
| 4 | 16 | 48 | 144 | 80 | 112 | 208 |
| 5 | 32 | 96 | 288 | 160 | 224 | 416 |
| 6 | 64 | 192 | 576 | 320 | 448 | 832 |
| 7 | 128 | 384 | 1152 | 640 | 896 | 1664 |
| 8 | 256 | 768 | 2304 | 1280 | 1792 | 3328 |
| 9 | 512 | 1536 | 4608 | 2560 | 3584 | 6656 |
| 10 | 1024 | 3072 | 9216 | 5120 | 7168 | 13312 |
| 11 | 2048 | 6144 | 18432 | 10240 | 14336 | 26624 |
| 12 | 4096 | 12288 | 36864 | 20480 | 28672 | 53248 |

FIG.5

SELECTED DIVISOR Nc AND STEP SIZE

| Nc | STEP | Nc | STEP | Nc | STEP | Nc | STEP |
|----|------|-----|------|------|------|------|------|
| 1  | 1    | 24  | 4    | 160  | 32   | 1152 | 128  |
| 2  | 1    | 28  | 4    | 192  | 32   | 1280 | 256  |
| 3  | 1    | 32  | 4    | 224  | 32   | 1536 | 256  |
| 4  | 1    | 36  | 4    | 256  | 32   | 1792 | 256  |
| 5  | 1    | 40  | 4    | 288  | 32   | 2048 | 256  |
| 6  | 1    | 48  | 8    | 320  | 64   |      |      |
| 7  | 1    | 56  | 8    | 384  | 64   |      |      |
| 8  | 1    | 64  | 8    | 448  | 64   |      |      |
| 9  | 2    | 72  | 8    | 512  | 64   |      |      |
| 10 | 2    | 80  | 16   | 576  | 64   |      |      |
| 12 | 2    | 96  | 16   | 640  | 128  |      |      |
| 14 | 2    | 112 | 16   | 768  | 128  |      |      |
| 16 | 2    | 128 | 16   | 896  | 128  |      |      |
| 18 | 2    | 144 |      | 1024 |      |      |      |
| 20 | 2    |     |      |      |      |      |      |

FIG.6

METHOD AND SYSTEM FOR DERIVING DYNAMIC DATA CLOCKS FROM PN CODES

BACKGROUND OF THE INVENTION

1. Field of the Invention

The present invention relates to spread spectrum communication systems using PN coding techniques and, more particularly, to generating data clocks synchronous with PN code epochs.

2. Prior Art

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver, the signal is de-spread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code chip rate, which in turn may be an integer multiple of the symbol rate $R_s$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time, a PN generator feeds a frequency synthesizer a sequence of n chips that dictates one of 2n frequency positions. The receiver follows the same frequency hop pattern. FHSS systems are also well known in the art and need not be discussed further.

As noted, the DSSS system PN-code sequence spreads the data signal over the available bandwidth such that the signal appears to be noise-like and random; but the signal is deterministic to a receiver applying the same PN-code to de-spread the signal. However, the receiver must also apply the same PN-code at the appropriate phase in order to de-spread the incoming signal, which explicitly implies synchronization between the receiver and transmitter.

In addition, the receiver data clock used by the receiver must be the same as the data clock used by the transmitter in order to retrieve user data. Generally, the transmitter data clock rate is generated at an octave rate such as $2^n$, n=0,1,2,3 . . . It will be appreciated that as n increases, the step between clock rates also increases exponentially as $2^{(n+1)} - 2^n = 2^n$. Moreover, the power and bandwidth requirements are also increased proportionally for each step. For example, a system operating with a data clock at $2^2$ data clock cycles might require 10 watts; a similar system would require 20 watts when operating at $2^3$ data clock cycles.

In addition, to retrieve the PN encoded data the receiver must complete two generally independent steps: first it must synchronize with the PN code, and then obtain the data clock from a bit/symbol synchronizer such as a narrow band phase lock loop tracking filter and associated circuitry. The multiple steps and hardware add both time and expense to the receiver performance parameters.

It is therefore desirable to provide a method and system whereby the data clock and component PN codes are related in order to reduce the receiver steps and hardware. It is also desirable that the method and system allow for a selection of data clock rates with other than exponential growth rates.

SUMMARY OF THE INVENTION

The foregoing and other problems are overcome, and other advantages are realized, in accordance with the presently preferred embodiments of these teachings.

In accordance with one embodiment of the present invention a method for generating a data clock having edge coincidence with an aggregate PN code is provided. The method includes the steps of providing an aggregate PN code generator having an epoch output and resetting a data clock generator when the aggregate PN code generator generates an epoch signal. Between resets the method includes the steps of driving the data clock generator with a PN master clock and a PN master clock divisor; where the divisor is derived from primary factor(s) of the PN codes forming the aggregate PN code.

In accordance with another embodiment of the present invention, a system for generating a data clock synchronous with PN component code minor epochs is provided. The system includes a first PN code generator for generating a first binary PN code of length $2^n$, where n=0,1,2,3, . . . k, and where k is predetermined; a second PN code generator for generating a second PN code according to a maximal length code $2^m-1$, where integer $m \leq k$ and where the maximal length code has an epoch in common with a binary code epoch. The system also includes a data clock generator, having an input PN master clock port, operating at a frequency "$R_c$" hz. The data clock generator also includes another port that specifies the desired divisor $N_c$. $N_c$ is known a priori as a parameter of the data rate of interest. A preferred embodiment allows for multiple $N_c$'s that may be implemented at coordinated times through out a communication. A binary divider coupled to the divisor generator, and the first and second PN code generators, divides a PN master clock signal received on the input PN master clock port by divisor $N_c$ to obtain the desired symbol clock. The binary divider resets with the common occurrence of the maximal length code epoch and the binary code epoch, thus generating a symbol clock that has a deterministic leading-edge (or trailing-edge) coincidence with the maximal-length and binary-length code epochs.

The invention is also directed towards an integrated circuit (IC). The IC includes a first PN code generator for generating a first PN code comprising a binary code $2^n$, where n=0,1,2,3, . . . k, and where k is predetermined and a second PN code generator for generating a second PN code comprising a maximal length code $2^m-1$, where integer $m \leq k$ and where the maximal length code has a maximal length code epoch in common with the binary code epoch. A data clock generator having an input PN master clock port is connected to a divisor generator for generating divisor $N_c$; and wherein the binary divider divides a PN master clock signal in accordance with the divisor $N_c$ and resets with the common occurrence of the maximal length code epoch and the binary code epoch. The IC may be an application specific IC (ASIC) or a field programmable gate array (FPGA).

The invention is also directed towards a program storage device readable by a machine, tangibly embodying a program of instructions executable by the machine to perform method steps for generating a data clock having edge coincidence with an aggregate PN code. The method includes the steps of providing a PN master clock driving an aggregate PN code generator having an epoch output; and dividing the PN master clock by a PN master clock divisor to generate a data clock. The data clock is reset when the aggregate PN code generator generates an epoch signal. The program of instructions may include at least one Hardware Description (HDL) Language file such as a Very High Speed Integrated Circuit (VHSIC) HDL.

In accordance with another embodiment of the invention a direct sequence spread spectrum system is provided. The system includes a transmitter having a first PN code generator for generating a first binary PN code $2^n$, where n=0,1,2,3, . . . k, and where k is predetermined; and a second PN code generator for generating a maximal length code $2^m-1$, where integer $m \leq k$ and where the maximal length code has a maximal length code epoch in common with a binary code epoch. The system also includes a third PN code generator for generating a third PN code, wherein primary factors of the third PN code are not common with primary factors of the first or second PN codes. The transmitter also includes a data clock generator having an input PN master clock port and a divisor generator for generating PN master clock divisor $N_c$. A binary divider coupled to the divisor generator divides the PN master clock signal in accordance with divisor $N_c$ and resets with the common occurrence of the maximal length code epoch and the binary code epoch. The receiver includes a fourth PN code generator for generating the first PN code and a fifth PN code generator for generating the second PN code. The receiver also includes a sixth PN code generator for generating the third PN code. The receiver includes a second data clock generator having a PN master clock port and a second divisor generator for generating the divisor $N_c$. Similar to the transmitter section a second binary divider divides a second PN master clock signal received on the second input PN master clock port in accordance with second divisor $N_c$ and resets with the common occurrence of the maximal length code epoch and the binary code epoch.

BRIEF DESCRIPTION OF THE DRAWINGS

The foregoing aspects and other features of the present invention are explained in the following description, taken in connection with the accompanying drawings, wherein:

FIG. 5 is a table of divisor $N_c$ values developed from exemplary X- and Y- PN codes;

FIG. 6 is a table showing selected values from the table shown in FIG. 5 and associated step sizes between groups of $N_c$ values.

DETAILED DESCRIPTION OF THE PREFERRED EMBODIMENT

Figure 1:
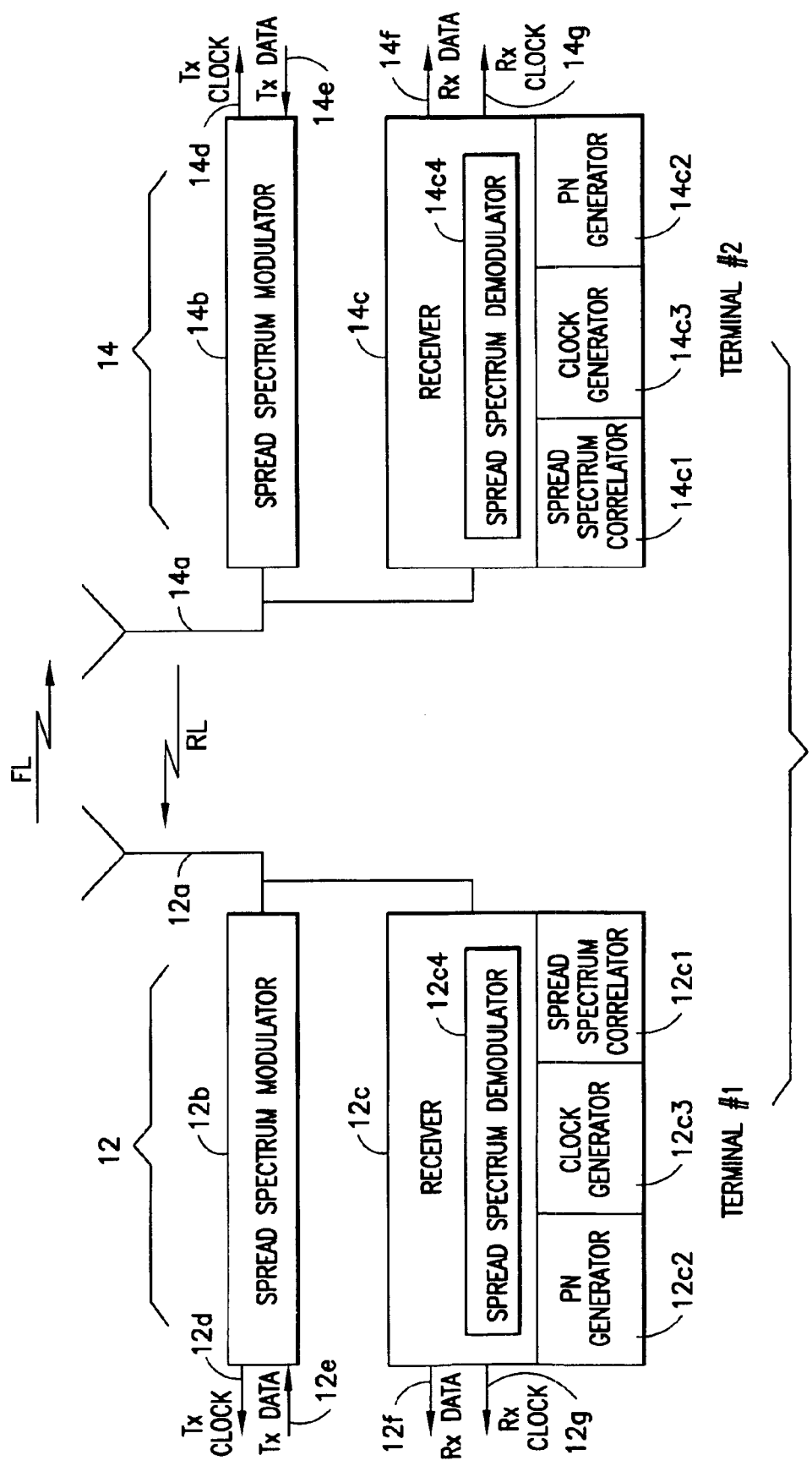
FIG. 1 is a pictorial diagram of a telecommunications system incorporating features of the present invention.

Referring to FIG. 1, there is shown a pictorial diagram of a telecommunications system incorporating features of the present invention. Although the present invention will be described with reference to the embodiments shown in the drawings, it should be understood that the present invention might be embodied in many alternate forms of embodiments, e.g., point-to-point simplex links, point-to-multipoint links, and either simplex or full-duplex links.

Still referring to FIG. 1, there is shown a full-duplex system 10 that is suitable for practicing this invention. Specifically, the system 10 employs direct sequence spread spectrum based techniques over an air link to provide data transfer between Terminal #1 12 and Terminal #2 14. The forward link (FL) from Terminal #1 12 to Terminal #2 14 consists of a spread spectrum waveform that is constructed in the manner described herein, with the PN code being composed of binary and maximal length codes. In a similar manner, the return link (RL) from Terminal #2 14 to Terminal #1 12 consists of a spread spectrum waveform that is similar or identical to that of the FL. It will be appreciated that an advantage of the present invention allows the data rates of the FL and RL to be changed synchronously and seamlessly at the transmit or receive (modulator and demodulator) ends of the link without the need for bit synchronizers.

Still referring to FIG. 1, Terminal #1 12 includes a Spread Spectrum Modulator (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. Terminal #1 12 also includes an antenna 12a which may transmit at any suitable RF frequency.

The signal generated by Terminal #1 12 and transmitted by antenna 12a via the FL is received by Terminal #2 14 via antenna 14a to receiver 14c. Receiver 14c includes a spread spectrum correlator 14c1, PN generator 14c2, clock generator 14c3, and spread spectrum demodulator (SSD) 14c4. The received signal is then demodulated by SSD 14c4. Once the signal is acquired and the receiver 14c is tracking the received signal, the Rx Clock 14g and Rx Data 14f are output to the intended user. It will be appreciated that the data clocks 14g and 12d are synchronous and may be commanded to change frequency on the binary- and maximal-length PN epochs; thus advantageously providing means to vary the data rate without interruption; and without the need for bit synchronizers to acquire and track at the new clock frequency with their associated loss of clock coherence between the transmitter and receiver.

Similarly, Terminal #2 14 generates a Tx Clock 14d and Tx Data 14e using the Spread Spectrum Modulator 14b in a similar fashion described earlier for Terminal #1. Likewise, Terminal #12 may receive the RL signal via antenna 12a, and demodulate and track the signal as described earlier with receiver 12c to provide Rx Data 12f and Rx Clock 12g to the intended user.

Figure 2A:
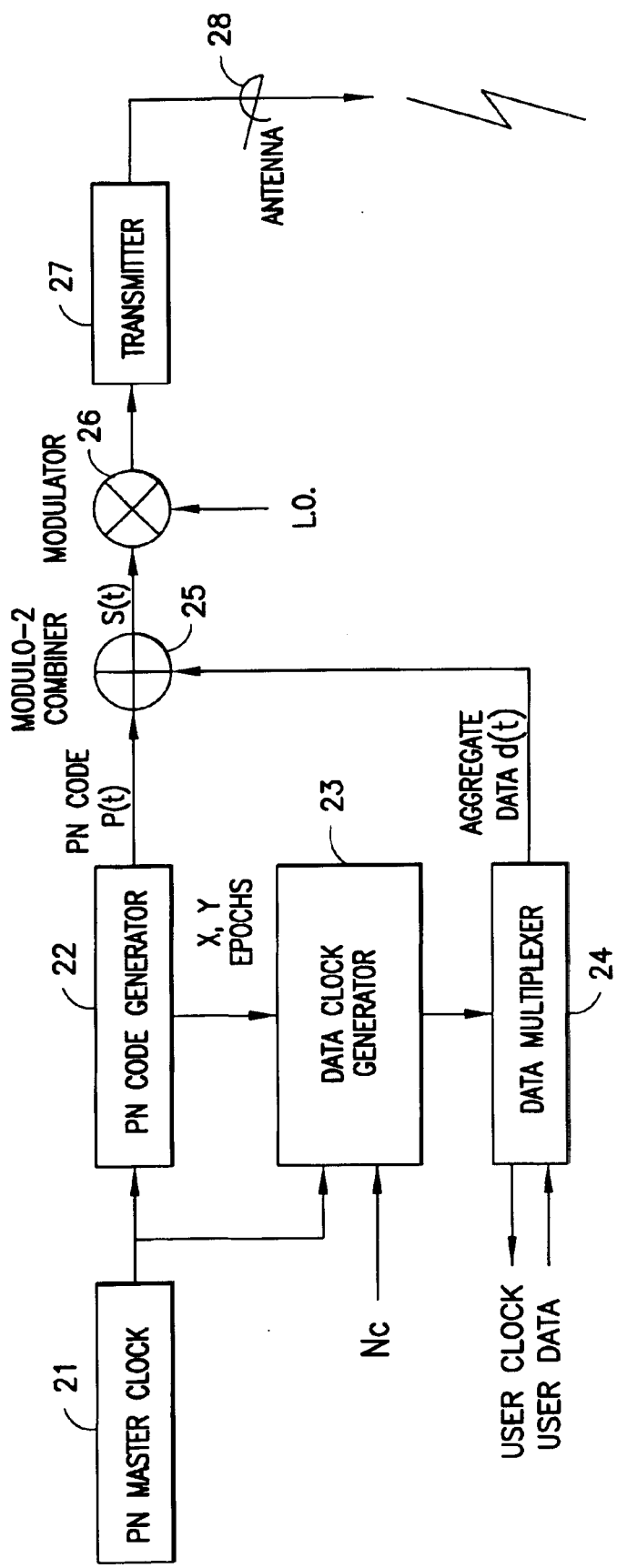
FIGS. 2A and 2B are system level block diagrams of the system shown in FIG. 1, illustrating PN code derived data-clock features of the present invention.
Figure 2B:
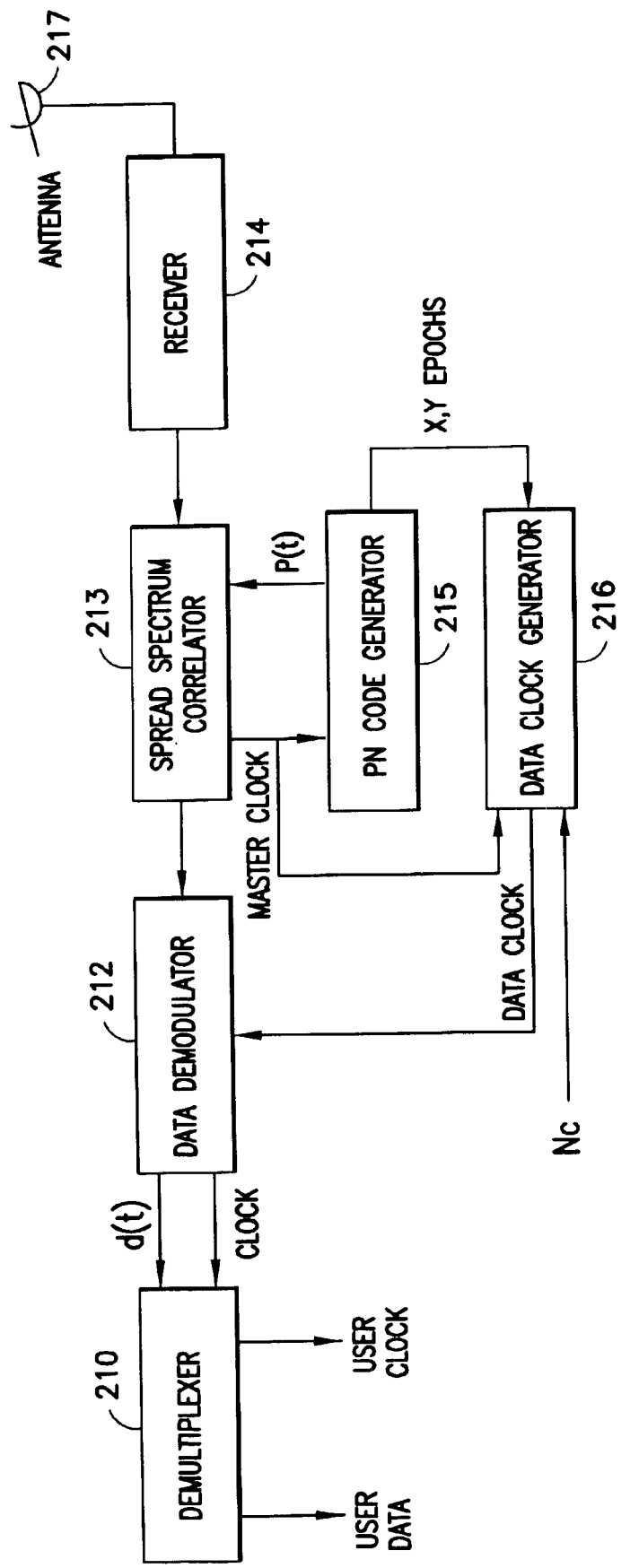

Referring now to FIG. 2 there is shown a simplified block diagram showing a representative DSSS transmitter system 2A incorporating feature of the present invention. The transmitter includes a PN master clock 21, a PN code generator 22, a data clock generator 23, a data multiplexer 24, a modulo-2 combiner 25, a modulator 26, transmitter 27, and an antenna 28. The PN master clock 21 is used to generate the clock signals for the PN generator 22 and the data clock generator 23. The data clock generator 23 uses the master clock 21, the divisor $N_c$, and the XY-epochs to generate the desired data clock signal. The data clock signal is then used to drive the data multiplexer 24 to produce aggregate data d(t). The PN code generator 22 provides an aggregate PN code p(t) which is modulo-2 combined with the aggregate data d(t) from the multiplexer 24 to produce baseband signal s(t). The signal s(t) modulates the carrier using a mixer 26 and local oscillator, LO. The resultant modulated signal is transmitted via antenna 28 to the DSSS receiver 2B.

The modulated signal from the DSSS transmitter 2A is received via the DSSS receiver antenna 217 and receiver 214. The signal from the receiver 214 is input to a spread spectrum (SS) correlator 213, which correlates the received PN encoded signal with a local PN code generated by the receiver PN code generator 215. The SS correlator 213 includes a receiver master clock generator, which, after correlation and PN tracking functions are preformed, is synchronous with the DSSS transmitter master clock 21. The master clock signal from the SS correlator clocks the PN code generator 215 to generate the aggregate PN code sequence p(t). The receiver data clock generator 216 produce the data clocks required by the demodulator 212. The data clock divisor $N_c$ is input to the data clock generator. The data demodulator performs conventional matched filter functions and outputs data and clock to the data demultiplexer; user data and user clock are output to receiver circuitry (not shown).

As disclosed herein, the present invention describes a novel method and system for synchronizing PN master clocks and data clock rates by generating divisor $N_c$ in accordance with the subcomponent codes forming the aggregate PN code p(t). As used herein an aggregate PN is defined as an aggregate of at least two subcomponent PN codes. In the preferred embodiment, the aggregate PN code is constructed with at least three subcomponent PN codes. However, in alternate embodiments any suitable number of subcomponent PN codes may be used.

Figure 3C:
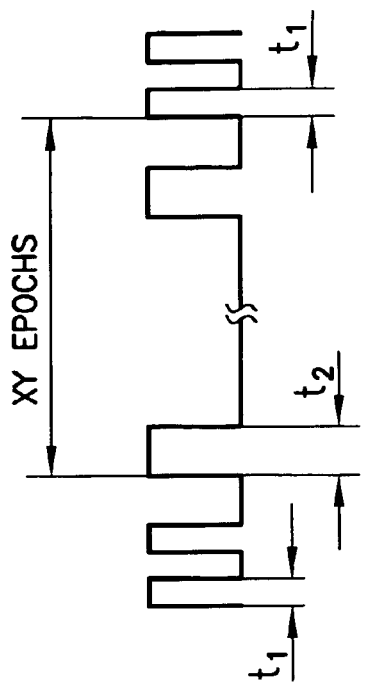
FIG. 3C is a waveform diagram showing data clock transitions occurring at XY PN code epochs.
Figure 3A:
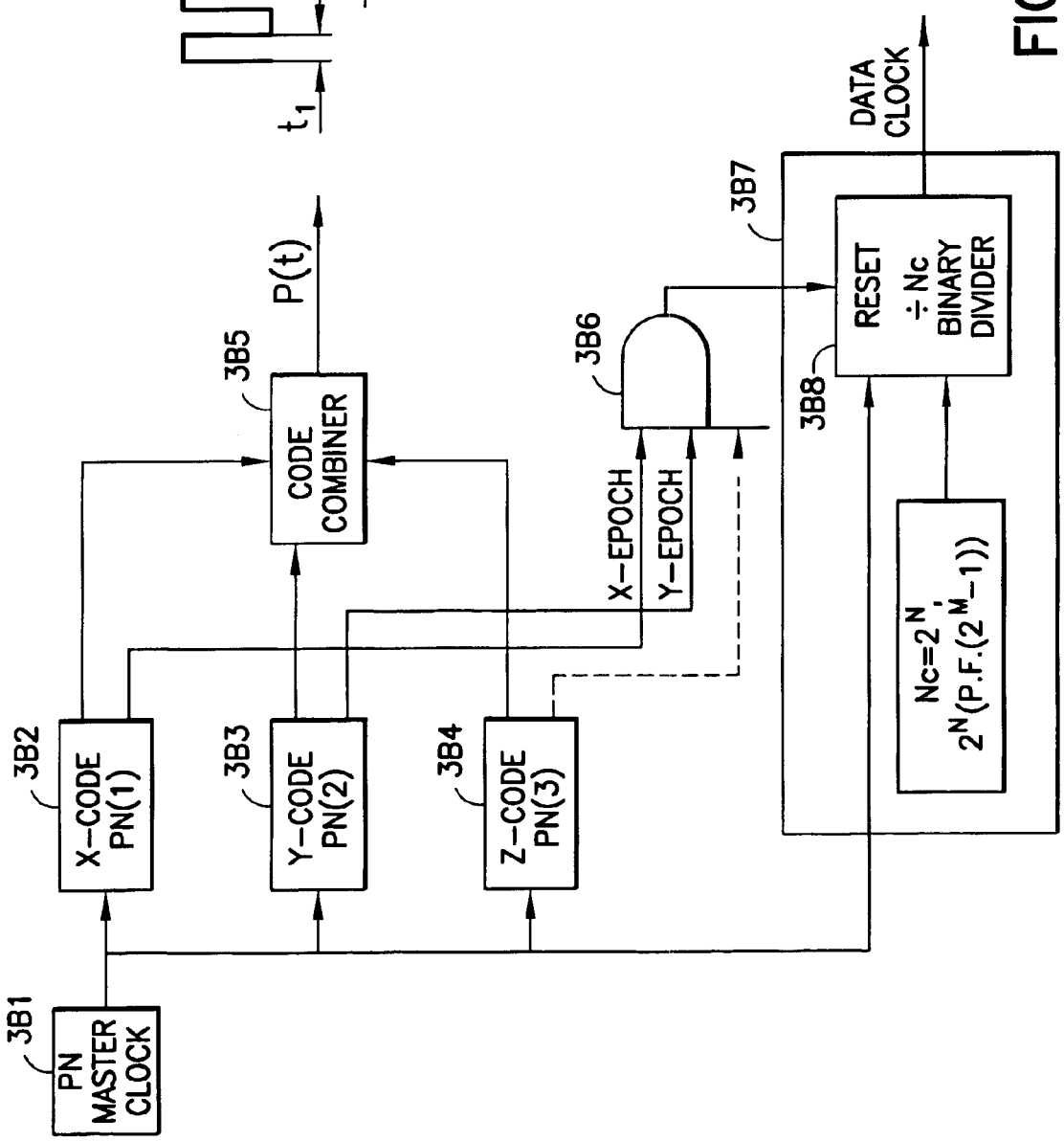
FIG. 3A is a block diagram of the present invention showing alternate embodiments of the data clock generation features of the present invention.

Referring also to FIG. 3A there is shown a block diagram of the data clock generator 3B7 incorporating features of the present invention. The X-code generator 3B2 generates a binary $2^n$ PN code, where n=0,1,2,3 . . . max. The Y- code generator 3B3 generates a maximal length code $2^m-1$, where m is an integer value≦n. The Z-code generator 3B4 generates any suitable PN code to be combined with the X- and Y-codes in code combiner 3B5. Code combiner 3B5 may be any suitable code combiner such as a MAND code combiner or a MAJ code combiner, both of which are known in the art. The divide by $N_c$ binary divider 3B8 divides the PN master clock 3B1 signal by a divisor $N_c$. Where $N_c$ is determined by the prime factors of the binary and maximal-length PN code generators X and Y (and optionally Z) as shown in FIG. 3A. In a preferred embodiment, the X binary code provides prime factor 2, and the Y code is selected to be of length $2^{12}-1 = 4095$. The Y code of length 4095 contains prime factors: 3,3,5,7,13. Note that the prime factors are multiplied together to produce the code length, i.e. 4095=3×3×5×7×13. The set of possible divisor $N_c$ values available using these code lengths can be obtained by generating the table shown in FIG. 6. FIG. 6 gives in tabular format the possible values of $N_c$ for each combination of prime numbers: 2, 3, 3×3, 5,7, and 13. Stated differently, any value of $N_c$ listed in FIG. 6 may be used as PN master clock divisors. Each value of $N_c$ in FIG. 6 has the properties of generating synchronous symbol clocks that are edge coincident with the X- and Y- PN code epochs.

Figure 7:
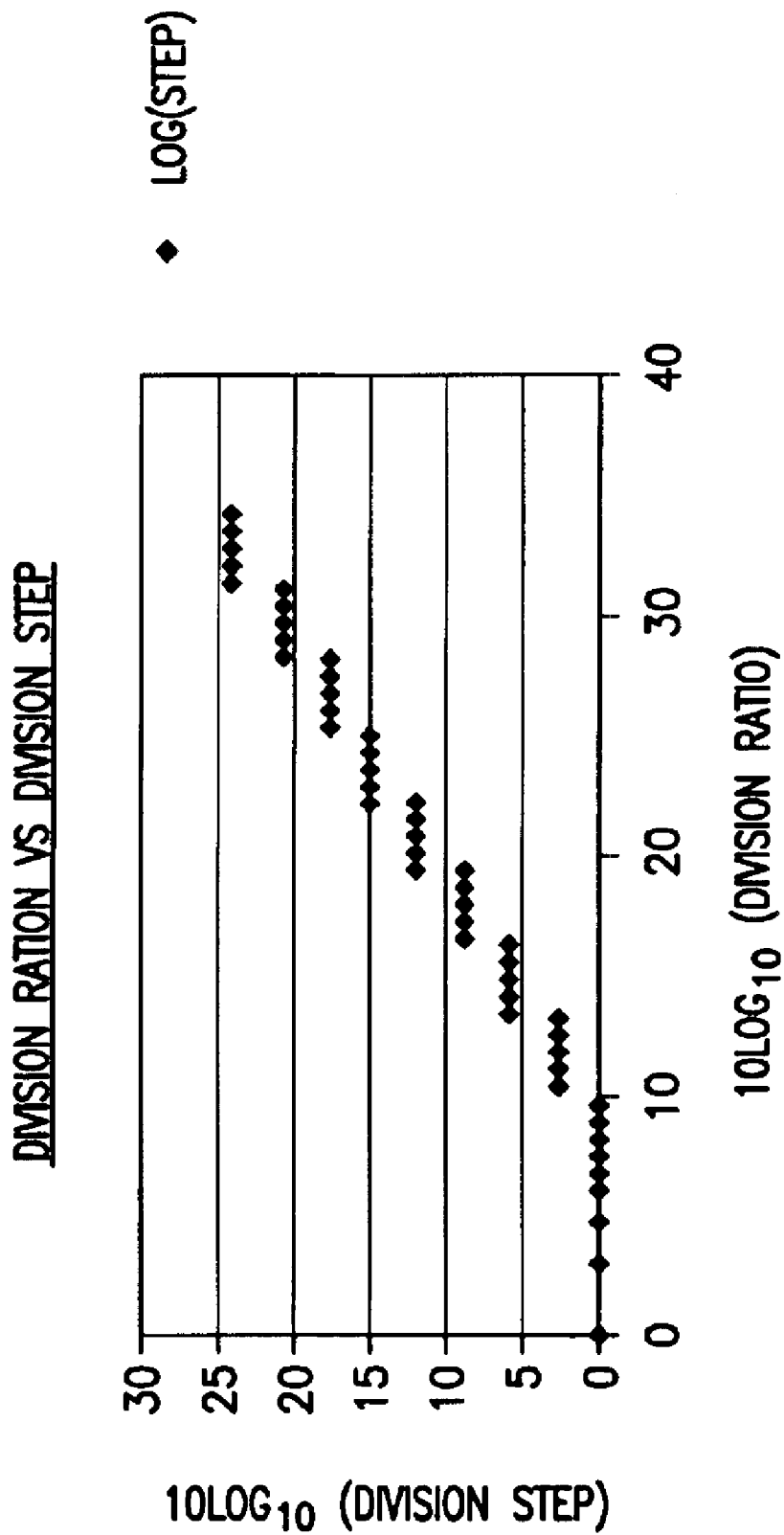
FIG. 7 is a graph illustrating a relationship between the selected $N_c$ values and their associated groups shown in FIG. 6.

In practice, and in a preferred embodiment, only a subset of the available $N_c$ values listed in FIG. 6 is required to obtain the desired set of $N_c$ values to generate the log-linear division ratio versus division step size illustrated in FIG. 7. The rates selected in FIG. 7 for a preferred embodiment are listed numerically in FIG. 6. The $N_c$ values in FIG. 6 are obtained from FIG. 5 by throwing away or discarding those values of Nc that are not needed or are undesired. The end result is a set of $N_c$ values: 1,2,3,4,5,6,7,8,9,10,12,14 . . . 2048. Note that the step size between successive Nc values is equal to 1 for Nc less than 10 and that each integer between 1 and 10 is included (i.e. there are no gaps). Between $N_c$ values of 10 and 20 the step size is 2. Between $N_c$ values to 20 and 40 the step size is 4. This trend continues and is bounded only by the limits of the X- and Y- PN code lengths. The progressive step size between selected values of $N_c$, as $N_c$ increases, is desirable and practical in the selection of data rates for practical system application. For example, going between $N_c$ values 2 and 3 represents a rate change of 3/2 =1.5 which is a significant (50%) and useful data rate step. On the other hand, for example, making a rate change between 1020 and 1021 represents a data rate change of 1.00196 or an insignificant 0.196 percent change.

Figure 3B:
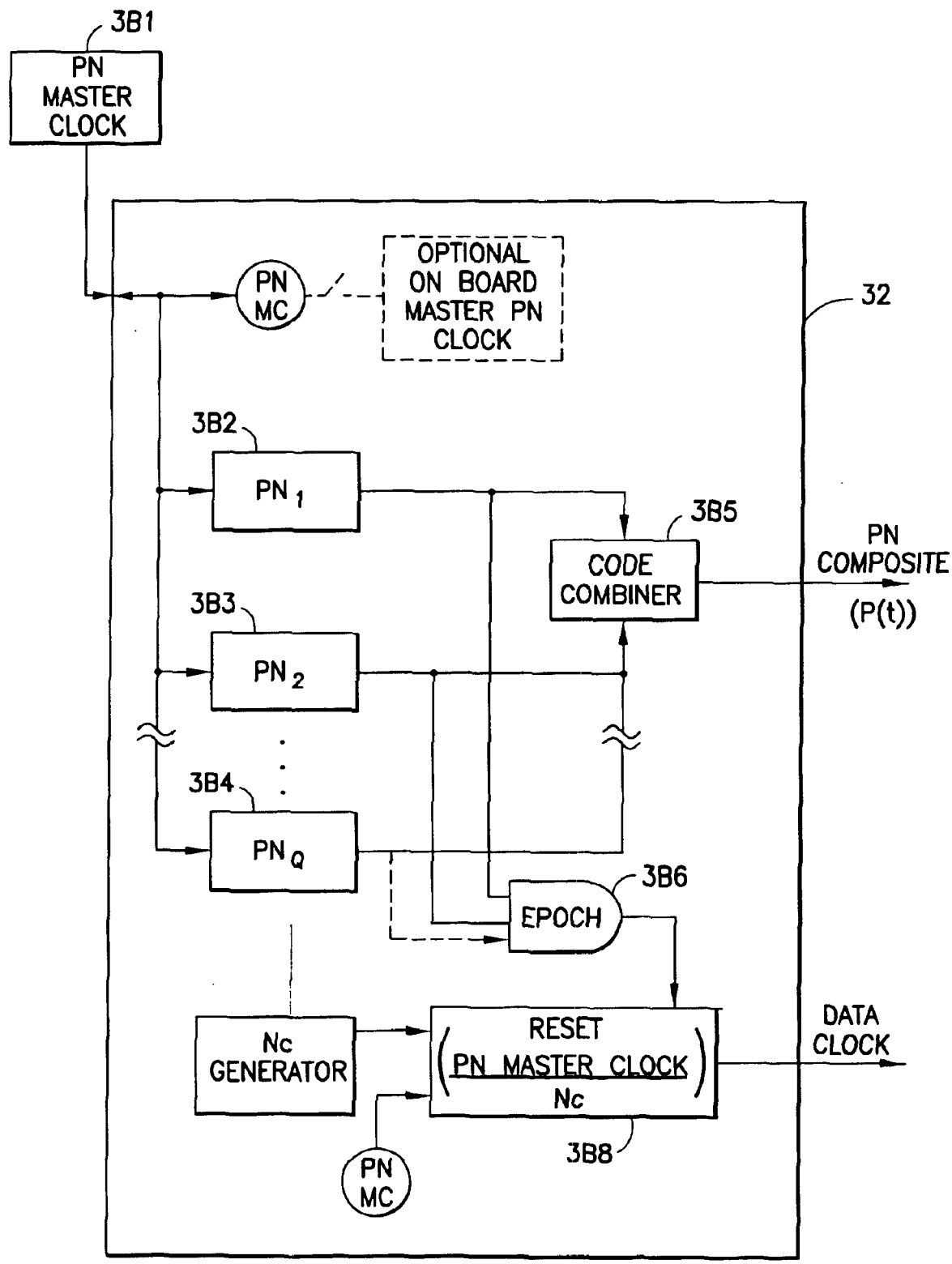
FIG. 3B is a block diagram showing an integrated circuit incorporating features of the present invention.

Still referring to FIG. 3A, the divide by $N_c$ binary divider 3B8 is reset by XY epochs detected by AND gate 3B6 to transition from one data clock rate to a second data clock rate (for example: FIG. 3C, $t_1$ to $t_2$). In the preferred embodiment the transition from one data clock rate to the second data clock rate is accomplished nearly simultaneously on the transmitter and receiver. In alternate embodiments any suitable logic circuit may be used to detect XY epochs and to reset the binary divider 3B8. FIG. 3B shows the functional blocks of FIG. 3A on an integrated circuit 32.

Figure 4:
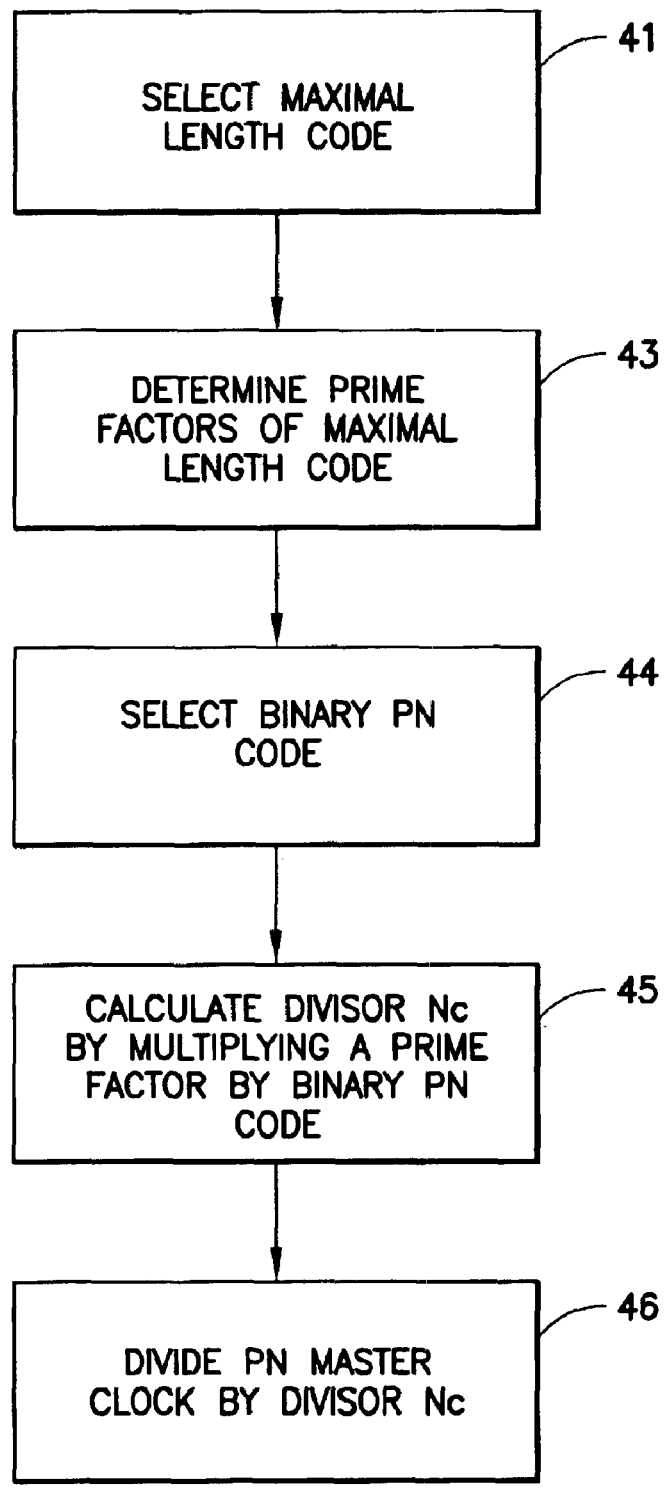
FIG. 4 is a flow chart of one method for implementing features of the present invention.

Referring also to FIG. 4, the Y-code is preferably selected, step 41, to be a maximal length code $2^m-1$, where m≦n associated with the binary X-code $2^n$. It will be appreciated that in alternate embodiments the Y-code may be any suitable maximal length code.

The X-code length is selected, step 44 to be of length $2^n$, for n=0,1,2,3 . . . max. This code contains the prime number 2 and can be used to generate binary (2,4,8, . . . ) data clock divisions that are leading edge coincident with the X-epoch. In alternate embodiments trailing edge coincidence may be used. The X-code is preferably generated by inserting a "1" (or "0") after the Y-code maximal length code $2^m-1$ (see below); in this manner the invention advantageously minimizes hardware and exploits the auto-and cross-correlation properties of the PN codes. In alternate embodiments other codes having suitable auto-and cross-correlation codes could also be used.

In the preferred embodiment the Z-code is not used in the generation of data clocks. The Z-code is preferably selected to include prime number factors that are relatively prime (i.e., no shared prime multiplicand) with the X- and Y- PN codes.

Still referring to FIG. 4, the prime factors of the maximal length code are determined, step 43. A subsequent step, 45, determines a divisor $N_c$ by selecting a factor from the prime factorization of the maximal length Y-code $2^{max}-1$, and multiplying the factor by the binary X-code $2^n$, n=0,1,2,3 . . . max (see table 1 and example below). This PN code derived divisor $N_c$ is then used to divide, step 46, the dividend, and the PN master clock (item 21 in FIG. 2), to generate the data clock. It will be appreciated that deriving the data clock from the PN master clock in this manner ensures coincidence between a PN master clock cycle leading edge and a XY-epoch data clock cycle.

It should be understood that the foregoing description is only illustrative of the invention. Various alternatives and modifications can be devised by those skilled in the art without departing from the invention. For example, in alternate embodiments the Z-code could be another maximal length code with suitable prime factorization numbers, which provide additional divide capability such that a cycle of the PN master clock is coincident with an XYZ-epoch. Accordingly, the present invention is intended to embrace all such alternatives, modifications and variances that fall within the scope of the appended claims.

What is claimed is:

1. A method for generating a data clock having edge coincidence with an aggregate PN code, the method comprising:
   providing an aggregate PN code generator having an epoch output;
   providing a PN master clock;
   providing a PN master clock divisor $N_c$;
   generating a data clock having edge coincidence with an aggregate PN code by driving a data clock generator with the PN master clock and the PN master clock divisor $N_c$; and
   resetting the data clock generator when the aggregate PN code generator generates a signal through the epoch output.

2. A method as in claim 1 wherein providing the aggregate PN code generator having the epoch output comprises:
   providing a plurality of PN subcomponent code generators, wherein each of the plurality of PN subcomponent code generators generates PN codes whose prime factors are unique from each of the other PN codes, and wherein at least two of the plurality of PN subcomponent codes have at least one common epoch point.

3. A method as in claim 2 wherein providing the plurality of PN subcomponent code generators comprises:
   one of the plurality of PN subcomponent code generators generating a binary code $2^n$, for n=0,1,2,3, . . . k, where k is predetermined; and
   another one of the plurality of PN subcomponent code generators generating a maximal length code $2^m-1$, for m≦n.

4. A method as in claim 3 wherein providing the PN master clock divisor $N_c$ comprises:
   prime factorizing the maximal length code $2^m-1$, for m=n; and
   generating the PN master clock divisor $N_c$ according to $2^n$, or $2^n$ multiplied times a prime factor or prime factor multiple in accordance with the prime factorizing of the maximal length code $2^m-1$.

5. A method as in claim 4 wherein generating the PN master clock divisor $N_c$ comprises generating the PN master clock divisor $N_c$ according to a predetermined step relationship.

6. A method as in claim 5 wherein the predetermined step relationship comprises a log-linear step relationship.

7. A method as in claim 2 wherein providing the PN code generator comprises resetting a binary divider when the common epoch point occurs.

8. An integrated circuit having circuitry for executing the method of claim 1.

9. A program storage device readable by a machine, tangibly embodying a program of instructions executable by the machine to perform the method of claim 1.

10. A system for generating a data clock synchronous with PN component code minor epochs, the system comprising:
    a first PN code generator for generating a first PN code comprising a binary code $2^n$, where n=0,1,2,3, . . . k, and where k is predetermined;
    a second PN code generator for generating a second PN code comprising a maximal length code $2^m-1$, where integer m=n and where the maximal length code has at least one maximal length code epoch in common with at least one binary code epoch;
    a data clock generator, the data clock generator comprising;
    an input PN master clock port;
    a divisor generator for generating a divisor $N_c$; and
    a binary divider coupled to the divisor generator and the first and second PN code generators, wherein the binary divider divides a PN master clock signal received on the input PN master clock port in accordance with the divisor $N_c$ and resets with the common occurrence of the maximal length code epoch and the binary code epoch.

11. A system as in claim 10 further comprising a third PN code generator, the third PN code generator generating a third PN code having prime factors not common with either the first PN code generator or the second PN code generator.

12. A system as in claim 11 further comprising a PN code combiner having inputs coupled to the first and second PN code generators.

13. A system as in claim 12 wherein the PN code combiner comprises a MAND code combiner for combining outputs of the first (X), second (Y), and third ($Z_1$) PN code generators to produce a PN composite code p(t) according to:

$$X \oplus (Y \cdot Z_1).$$

14. A system as in claim 12 wherein the PN code combiner comprises a MAJ code combiner for combining outputs of the first (X), second (Y), and third ($Z_1$) PN code generators to produce a PN composite code p(t) according to:

$$(X \cdot Y) \oplus (Y \cdot Z_1) \oplus (X \cdot Z_1).$$

15. A system as in claim 10, wherein the divisor generator comprises a divisor $N_c$ look-up table.

16. An integrated circuit (IC), the IC comprising:
    a first PN code generator for generating a first PN code comprising a binary code $2^n$, where n=0,1,2,3, . . . k, and where k is predetermined;
    a second PN code generator for generating a second PN code comprising a maximal length code $2^m-1$, where integer m=n and where the maximal length code has at least one maximal length code epoch in common with at least one binary code epoch;
    a data clock generator, the data clock generator comprising;
    an input PN master clock port;
    a divisor generator for generating a divisor $N_c$; and
    a binary divider coupled to the divisor generator and the first and second PN code generators, wherein the binary divider divides a PN master clock signal received on the input PN master clock port in accordance with the divisor $N_c$ and resets with the common occurrence of the maximal length code epoch and the binary code epoch.

17. An IC as in claim 16 further comprising an on-chip master PN clock.

18. An IC as in claim 16 further comprising a third PN code generator for generating a third PN code, wherein primary factors of the third PN code are not common with primary factors of the first or second PN code.

19. An IC as in claim 16 further comprising an on-chip PN code combiner for combining the PN codes generated by the PN code generators.

20. A program storage device readable by a machine, tangibly embodying a program of instructions executable by the machine to perform method steps for generating a data clock having edge coincidence with an aggregate PN code, the method comprising the steps of:

generating an aggregate PN code having an epoch output;
   receiving an input from a PN master clock;
   calculating a PN master clock divisor $N_c$ from the aggregate PN code and the PN master clock input;
   dividing the PN master clock by the PN master clock divisor $N_c$ to generate a data clock that has edge coincidence with the aggregate PN code;
   and resetting the data clock when the generated aggregate PN code exhibits an epoch signal through the epoch output.

21. A program storage device as in claim 20 wherein the program of instructions comprise at least one Very High Speed Integrated Circuit (VHSIC) Hardware Description Language (VHDL) file.

22. A direct sequence spread spectrum system, the system comprising:

a transmitter, wherein the transmitter comprises:
      a first PN code generator for generating a first PN code comprising a binary code $2^n$, where n=0,1,2,3, ... k, and where k is predetermined;
      a second PN code generator for generating a second PN code comprising a maximal length code $2^m-1$, where integer m=n and where the maximal length code has at least one maximal length code epoch in common with at least one binary code epoch;
      a third PN code generator for generating a third PN code, wherein primary factors of the third PN code are not common with primary factors of the first or second PN code
      a data clock generator, the data clock generator comprising;
         an input PN master clock port;
         a divisor generator for generating a divisor $N_c$;
         a binary divider coupled to the divisor generator and the first and second PN code generators, wherein the binary divider divides a PN master clock signal received on the input PN master clock port in accordance with the divisor $N_c$ and resets with the common occurrence of the maximal length code epoch and the binary code epoch;
   a receiver, wherein the receiver comprises:
      a fourth PN code generator for generating the first PN code comprising the binary code $2^n$, where n=0,1,2, 3, ... k, and where k is predetermined;
      a fifth PN code generator for generating the second PN code comprising the maximal length code $2^m-1$;
      a sixth PN code generator for generating the third PN code, wherein primary factors of the third code are not common with primary factors of the first or second PN code;
      a second data clock generator, the second data clock generator comprising;
         a second input PN master clock port;
         a second divisor generator for generating a second divisor $N_c$; and
         a second binary divider coupled to the second divisor generator and the fourth and fifth PN code generators, wherein the second binary divider divides a second PN master clock signal received on the second input PN master clock port in accordance with the second divisor $N_c$ and resets with the common occurrence of the maximal length code epoch and the binary code epoch.

* * * * *

UNITED STATES PATENT AND TRADEMARK OFFICE
CERTIFICATE OF CORRECTION

PATENT NO. : 6,944,211 B2
DATED : September 13, 2005
INVENTOR(S) : Mower et al.

It is certified that error appears in the above-identified patent and that said Letters Patent is hereby corrected as shown below:

Column 7,
Line 53, delete "m=n" and replace with -- $m \leq n$ --.

Column 8,
Lines 13 and 59, delete "m=n" and replace with -- $m \leq n$ --.

Column 9,
Line 43, delete "m=n" and replace with -- $m \leq n$ --.

Signed and Sealed this

Fifteenth Day of November, 2005

JON W. DUDAS
*Director of the United States Patent and Trademark Office*